United States Patent [19]

Coxon et al.

[11] 4,131,109
[45] Dec. 26, 1978

[54] SOLAR COLLECTOR

[75] Inventors: DeWayne Coxon; Gary N. Bregg, both of Cedar Springs, Mich.

[73] Assignee: Jordan College, Cedar Springs, Mich.

[21] Appl. No.: 800,336

[22] Filed: May 25, 1977

[51] Int. Cl.$^2$ .............................................. F24J 3/02
[52] U.S. Cl. ................................................. 126/270
[58] Field of Search ..................... 126/270, 271; 136/89 PC

[56] References Cited

U.S. PATENT DOCUMENTS

| 3,490,950 | 1/1970 | Myer | 126/270 |
|---|---|---|---|
| 3,510,714 | 5/1970 | Geer | 136/89 PC |
| 3,990,430 | 11/1976 | Robertson | 126/270 |
| 4,011,855 | 3/1977 | Eshelman | 126/270 |
| 4,046,133 | 9/1977 | Cook | 126/271 |
| 4,059,093 | 11/1977 | Knowles et al. | 126/271 |
| 4,059,094 | 11/1977 | Barrio de Mendoza | 126/271 |

Primary Examiner—Carroll B. Dority, Jr.
Attorney, Agent, or Firm—Price, Heneveld, Huizenga & Cooper

[57] ABSTRACT

A solar collector assembly having within its housing a series of radiant energy entrapping collector elements, each having an energy absorbing base, a generally semi-cylindrical upwardly open reflector with concave, upper, receptor-reflector surfaces and convex lower receptor surfaces, a collector and radiation entrapping receptor projecting up in said reflector into the radiation reflection pattern of the concave surfaces. These elements form elongated fluid flow heat exchange passages.

2 Claims, 4 Drawing Figures

SOLAR COLLECTOR

BACKGROUND OF THE INVENTION

This invention relates to solar radiation collector assemblies and collector elements therefor.

Solar collector assemblies typically employ a housing formed of a tray enclosed on the top by a radiation transmitting cover of translucent or transparent glass or polymeric material. Within the housing is provided radiation absorbing surface area such as a black panel. Provision is made for a heat exchange fluid, gaseous or liquid, to flow through the housing.

One of the greatest limitations of solar heating presently is related to efficiency. The less efficient the unit, the greater the collector area required. But, useable area is typically limited by structural, cost, and aesthetic considerations. There is a well-known need in the solar energy field for a more highly efficient collector assembly. But efficiency is not the only need. Solar collectors should also be capable of simplified assembly by persons in the field, to enable widespread adoption of such in a relatively short period of time without the need for special expertise. Thus, homeowners should have an available product capable of assembly by themselves without complications. An efficient, readily assemblable solar collector should also be capable of rapid mass production at a reasonable cost.

SUMMARY OF THE INVENTION

It is an object of this invention to provide a solar collector assembly, and solar collector elements therefor, of high efficiency, capable of easy assembly without special expertise, capable of rapid mass production on generally known equipment in existence today, and not prohibitively expensive to manufacture.

The novel solar collector assembly has unique elongated elements, formed by extrusion into a special cross sectional configuration. The elements effect efficient radiation entrapping and absorbing structure. Each element includes a base with an upwardly concave receptor-reflector member cooperative with a receptor member projecting upwardly within the concave member into the reflection pattern of the radiation therefrom to entrap and absorb radiant energy. The resulting heat energy is conducted away from the collector by elongated fluid flow passages formed by and between the members. The elements are thus of elongated rod-type nature capable of easy placement in the housing side-by-side.

DESCRIPTION OF THE PREFERRED EMBODIMENT

Figure 1:
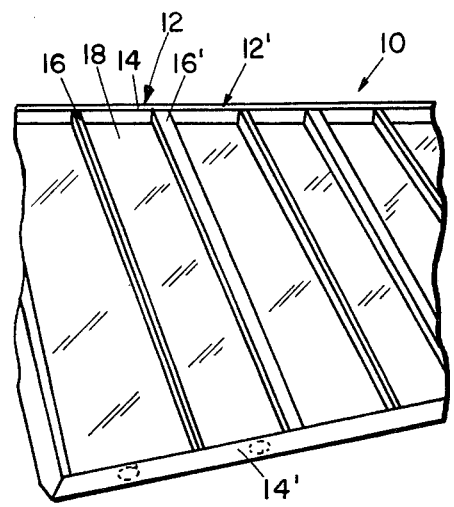
FIG. 1 is a fragmentary perspective view of a series of solar collector assemblies made in accordance with this invention.
Figure 2:
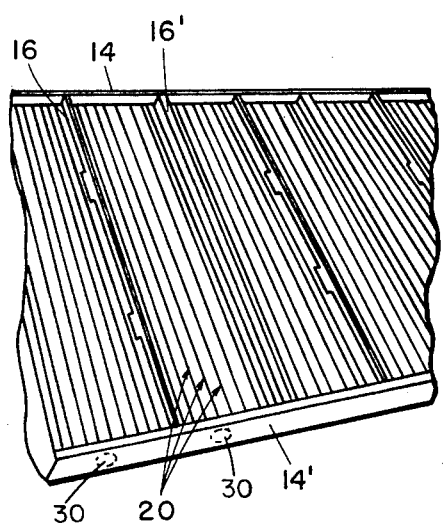
FIG. 2 is a fragmentary perspective view of the collectors in FIG. 1, showing the cover elements removed.

Referring now specifically to the drawings, the apparatus 10 depicted in FIG. 1 constitutes a series of solar collector assemblies 12, 12' and so forth. The number of such assemblies placed in series will vary depending upon the particular installation as desired and necessary. Each assembly, e.g. assembly 12, has a housing which is basically formed of a tray-like component with a radiation energy transmitting cover. More specifically, the tray, in conventional fashion includes a pair of end panels 14 and 14', a pair of side panels 16 and 16', and a bottom (not specifically shown) to form a tray-type container. The top of the tray is enclosed by a cover 18 of transparent or translucent material, typically glass or a polymeric material, capable of transmitting the radiant solar energy into the container.

The interior of the container has a series of unique elongated solar collector elements 20 lying in parallel side-by-side relationship over the bottom of the container. Each of these elements is specially formed and configurated as explained below.

Figure 3:
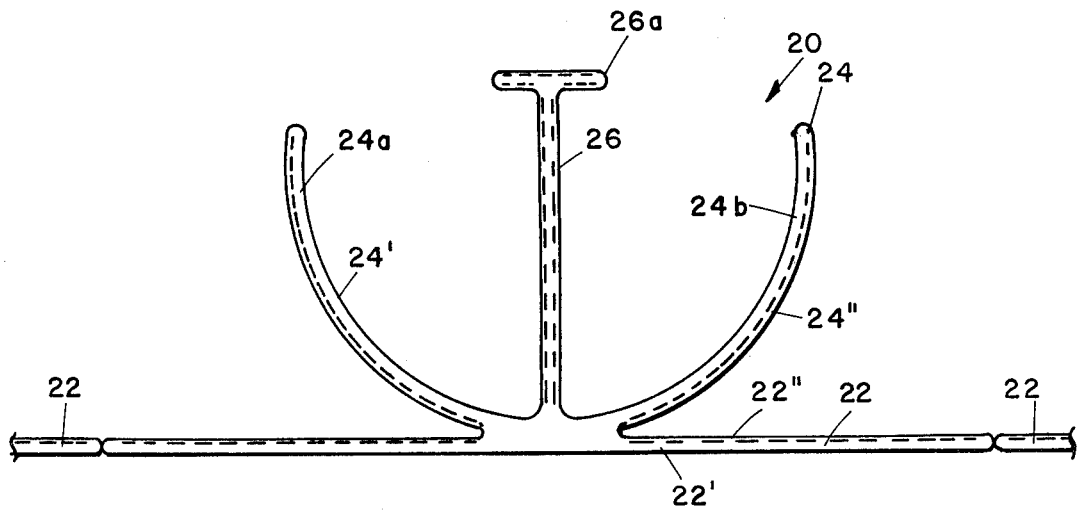
FIG. 3 is an end elevational view of one of the elongated solar collector elements of one of the assemblies in FIGS. 1 and 2.

More specifically, each element 20 is of metallic construction, preferably aluminum, optionally formed by extrusion techniques. It is an advantage of this invention that a conventional aluminum extruder with a specially shaped die can be utilized to continuously form a strip of the configurated material, which is sliced into lengths of desired dimension following extrusion. The cross section of the collector element is such as to cause efficient radiation entrapment and absorption, effect good heat exchange passages for the heat exchange fluid, and be capable of continuous production on an extruder. Element 20 includes an elongated base 22 which is generally flat in configuration, having a flat undersurface 22' which rests upon the bottom panel of the solar assembly tray, and an upper surface 22" serving as a radiation receptor surface. The generally flat upper surface 22" is not smooth, but rather is multioriented to maximize surface area and absorption, and minimize reflection of radiant energy therefrom. This may be readily accomplished by elongated serrations as explained hereinafter. When a series of the elements 20 are placed alongside each other, the outer edges of these base members 22 are in edge-to-edge abutting engagement as depicted in FIG. 3.

Projecting upwardly from the central portion of each elongated base member 22 is an elongated, generally semicylindrical receptor-reflector member 24 which is actually composed of two quarter-cylindrical upwardly and outwardly projecting components 24a and 24b. Member 24 therefore forms an arcuate, upwardly concave reflecting surface 24', and a downwardly convex receptor surface 24". Surface 24' is smooth. Surface 24" is rough, preferably serrated.

Projecting upwardly from the base member 22 and the central portion of the elongated receptor-reflector member 24 is an elongated stem-type, preferably generally T-shaped receptor member 26 which projects into the zone of reflected radiation from reflector surface 24'. This receptor 26 cooperates with member 24 to entrap solar radiation, especially as assisted by the cross component 26a of member 26. This cross component may be generally flat (as shown) to form a basically T-shaped configuration for member 26, or alternatively may project upwardly and outwardly to cause member 26 to have a Y-shaped configuration, or may project downwardly outwardly to cause member 26 to resemble an arrowhead. These variations are considered to be within the scope of the term generally T-shaped.

Figure 4:
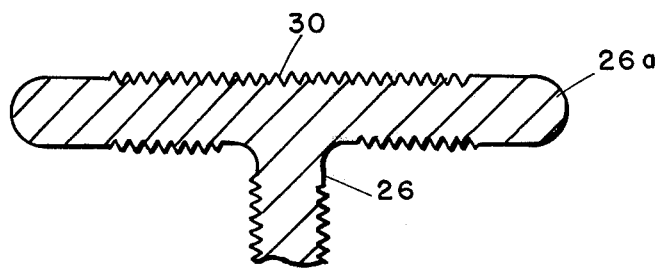
FIG. 4 is an enlarged sectional fragmentary view of a portion of the element in FIG. 3.

Certain surfaces of element 20 are specially formed so as to not be smooth, i.e. causing minimal reflection therefrom. Specifically, the upper and lower surfaces of the cross component 26a of member 26, and the two opposite side surfaces of member 26, the undersurfaces 24" of member 24, and the upper surfaces 22" of base member 22 are all formed with a roughened surface, for maximizing surface area and radiant energy absorption, minimizing radiant reflection therefrom, and maximizing heat exchange to the fluid, e.g. air, flowing the length of the elements. On an extruded component, this roughening can be conveniently achieved by forming the elongated serrations indicated for example by those shown on cross component 26a and the upright component of member 26 in enlarged FIG. 4, at the time of extrusion with matching surfaces on the extruder die. These serrations 30 preferably are formed at 90 degree angles, each having a width of approximately 0.005 inches.

As will be readily appreciated from a careful study of this assembly, radiant energy from above, when engaging reflection surface 24' will be partially absorbed and partially reflected to the upstanding receptor member 26 including the upright portion thereof and the cross component portion thereof. Some radiant energy will strike directly on the upper surface of cross component 26a and be absorbed. Further, base 22 will absorb radiant energy striking it, with reflection therefrom being entrapped by the lower convex surface 24" of element 20 or the adjacent element.

The surfaces of element 20 will preferably be dark, typically black. This darkened condition can be achieved physically as by painting or otherwise coating the surface, or chemically as by anodizing, or a combination of physical and chemical techniques known generally in the art, to maximize radiant energy absorption and conversion into heat energy.

It will be noted that the unique cross sectional configuration of these solar collector elements not only enables continuous mass production thereof and easy assembly thereof with each other, and not only serves for entrapment of radiant energy directed generally transverse to the main dimension of these elements, but also forms passages or conduits for heat exchange fluid along the length thereof. Thus, flow of a gas such as air into the housing through a suitable manifold inlet, e.g. 32 shown in phantom (or the equivalent), and lengthwise along these elements, will be along channels between member 26 and the two straddling quarter-cylindrical components 24a and 24b, and between adjacent elements by confinement between convex surfaces 24" and base surfaces 22" of two adjacent collector elements. The flow out of the housing can be through like outlets (not shown) or the equivalent. If, instead of a gaseous fluid exchange medium, it is desired to employ a liquid fluid exchange medium, such liquid can be caused to flow directly down these channels or alternatively, suitable conduits can be soldered to the elements for metal-to-metal-to-liquid heat exchange from the collector element to the conduit to the liquid.

The overall result is a solar collector which is capable of mass production by conventionally known machinery, readily formed into lengths of desired dimension, easily assembled together without any special expertise by simply laying them side-by-side, and efficiently collecting and converting radiant solar energy into heat energy. Certain additional advantages and minor variations will probably occur to those in the art upon studying this disclosure of the specifically preferred embodiment representing the invention. The invention is intended to be limited only by the scope of the appended claims and the reasonably equivalent structures to those defined therein.

The embodiments of the invention in which an exclusive property or privilege is claimed are defined as follows:

1. A solar collector assembly comprising:
    a housing having a tray and a radiant energy transmitting cover thereover; and a series of solar collector elements side-by-side in said tray, each said element comprising an elongated metallic extrusion having the following features:
    an elongated base having an underside support surface and an upper radiant energy absorbing surface;
    an elongated, generally T-shaped, radiant energy absorbing collector projecting upwardly above said base;
    a pair of elongated arcuate generally quarter-cylindrical reflector members projecting upwardly and outwardly from said base astraddle of said collector, having concave inner reflector surfaces oriented generally toward said collector to reflect radiant solar energy to said collector, and having convex outer surfaces.

2. A solar energy collector element comprising an elongated metallic extrusion having the following features:
    an elongated base having an underside support surface and an upper radiant energy absorbing surface;
    an elongated, T-shaped radiant energy absorbing collector projecting upwardly above said base;
    a pair of elongated arcuate generally quarter-cylindrical reflector members projecting upwardly and outwardly from said base astraddle of said collector, having concave inner reflector surfaces oriented generally toward said collector to reflect radiant solar energy to said collector, and having convex outer surfaces; and the surfaces of said collector, said convex outer surfaces of said members, and said upper base surface being multioriented for maximizing surface area and radiant energy absorption thereby.

* * * * *